US011325260B2

(12) United States Patent
Yeo et al.

(10) Patent No.: US 11,325,260 B2
(45) Date of Patent: May 10, 2022

(54) METHOD FOR OPERATING MOVING ROBOT

(71) Applicant: LG ELECTRONICS INC., Seoul (KR)

(72) Inventors: Junhee Yeo, Seoul (KR); Seunghee Kim, Seoul (KR); Yongjae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 287 days.

(21) Appl. No.: 16/438,627

(22) Filed: Jun. 12, 2019

(65) Prior Publication Data

US 2019/0381671 A1      Dec. 19, 2019

(30) Foreign Application Priority Data

Jun. 14, 2018    (KR) ......................... 10-2018-0067878

(51) Int. Cl.
*B25J 9/16* (2006.01)
*B25J 5/00* (2006.01)
*B25J 13/08* (2006.01)
*B25J 13/06* (2006.01)

(52) U.S. Cl.
CPC ............. *B25J 9/1697* (2013.01); *B25J 5/007* (2013.01); *B25J 13/06* (2013.01); *B25J 13/08* (2013.01)

(58) Field of Classification Search
USPC ................................................ 700/245–264
See application file for complete search history.

(56) References Cited

U.S. PATENT DOCUMENTS

| 5,832,189 A * | 11/1998 | Tow ...................... G06N 3/008 700/259 |
| 7,756,322 B2 * | 7/2010 | Saitou ................ H04N 1/00137 382/153 |
| 9,498,886 B2 * | 11/2016 | Rosenstein ............. B25J 5/007 |
| 10,486,312 B2 * | 11/2019 | Yamato .................. G06N 3/008 |

(Continued)

FOREIGN PATENT DOCUMENTS

| KR | 10-2005-0020661 | 3/2005 |
| KR | 10-2008-0030908 | 4/2008 |

(Continued)

OTHER PUBLICATIONS

Korean Office Action dated Jul. 10, 2020 issued in KR Application No. 10-2018-0067878.

(Continued)

*Primary Examiner* — Jonathan L Sample
(74) *Attorney, Agent, or Firm* — KED & Associates LLP

(57) ABSTRACT

A method of operating a mobile robot includes displaying, on a display unit, a photographing menu including a first photographing item for allowing the mobile robot to perform a specific motion for photographing and a second photographing item for allowing the mobile robot to photograph a user, displaying a screen for guiding a motion setting of the mobile robot on the display unit when the first photographing item is selected, performing, by the mobile robot, a corresponding motion based on an input motion setting for a first reference time when the motion setting of the mobile robot is input, and displaying a result screen on the display unit after the first reference time has elapsed.

19 Claims, 11 Drawing Sheets

(56) References Cited

U.S. PATENT DOCUMENTS

| | | | |
|---|---|---|---|
| 10,820,950 B2* | 11/2020 | Uenoyama | G16H 40/20 |
| 2005/0041839 A1* | 2/2005 | Saitou | H04N 1/00164 |
| | | | 382/103 |
| 2006/0293787 A1* | 12/2006 | Kanda | G06N 3/008 |
| | | | 700/245 |
| 2007/0276541 A1* | 11/2007 | Sawasaki | G05D 1/0246 |
| | | | 700/253 |
| 2009/0157221 A1* | 6/2009 | Sip | G06N 3/008 |
| | | | 700/245 |
| 2012/0185095 A1* | 7/2012 | Rosenstein | G05D 1/0227 |
| | | | 700/259 |
| 2012/0239196 A1* | 9/2012 | Olivier, III | B25J 9/1689 |
| | | | 700/259 |
| 2012/0277914 A1* | 11/2012 | Crow | H04N 5/23218 |
| | | | 700/259 |
| 2013/0066468 A1* | 3/2013 | Choi | B25J 11/008 |
| | | | 700/258 |
| 2013/0123987 A1* | 5/2013 | Kase | A63H 30/04 |
| | | | 700/259 |
| 2013/0338831 A1* | 12/2013 | Noh | B25J 9/1697 |
| | | | 700/259 |
| 2014/0277847 A1* | 9/2014 | Cann | B60L 53/14 |
| | | | 701/2 |
| 2015/0032260 A1* | 1/2015 | Yoon | G05D 1/0016 |
| | | | 700/257 |
| 2015/0183112 A1* | 7/2015 | Song | B25J 9/1656 |
| | | | 700/245 |
| 2015/0190927 A1* | 7/2015 | Sutherland | B25J 11/009 |
| | | | 700/259 |
| 2015/0314454 A1* | 11/2015 | Breazeal | B25J 11/001 |
| | | | 700/259 |
| 2016/0114488 A1* | 4/2016 | Mascorro Medina | B25J 11/008 |
| | | | 700/259 |
| 2016/0188977 A1* | 6/2016 | Kearns | G05D 1/0274 |
| | | | 348/113 |
| 2017/0203446 A1* | 7/2017 | Dooley | H04N 5/23206 |
| 2017/0266812 A1* | 9/2017 | Thapliya | B25J 11/008 |
| 2017/0361468 A1* | 12/2017 | Cheuvront | B25J 11/0085 |
| 2018/0001483 A1* | 1/2018 | Song | B25J 13/006 |
| 2018/0036879 A1* | 2/2018 | Buibas | B25J 9/0036 |
| 2018/0043543 A1* | 2/2018 | Buibas | B25J 18/02 |
| 2018/0075403 A1* | 3/2018 | Mascorro Medina | G06Q 10/087 |
| 2018/0081365 A1* | 3/2018 | Asukai | B25J 11/0005 |
| 2018/0085928 A1* | 3/2018 | Yamato | B25J 13/003 |
| 2018/0136615 A1* | 5/2018 | Kim | G06N 20/10 |
| 2018/0154514 A1* | 6/2018 | Angle | G16H 20/13 |
| 2018/0241938 A1* | 8/2018 | Buibas | B25J 9/1679 |
| 2018/0366121 A1* | 12/2018 | Funazukuri | B25J 11/0005 |
| 2018/0373239 A1* | 12/2018 | Tsubota | G05D 1/0268 |
| 2018/0376069 A1* | 12/2018 | Makino | H04N 5/232 |

FOREIGN PATENT DOCUMENTS

| | | |
|---|---|---|
| KR | 10-2013-0094058 | 8/2013 |
| KR | 10-2013-0141979 | 12/2013 |
| KR | 10-2018-0039438 | 4/2018 |

OTHER PUBLICATIONS

Korean Office Action dated Dec. 1, 2019 issued in KR Application No. 10-2018-0067878.

* cited by examiner

| COME NEXT TO ME AND POSE, THEN TAKE A PICTURE WITH YOUR MOBILE PHONE OR CAMERA | THE PHOTOGRAPHING IS OVER SOON 5 - 4 - 3 - 2 - 1 |
|---|---|
| (a) | (b) |

METHOD FOR OPERATING MOVING ROBOT

CROSS-REFERENCE TO RELATED APPLICATION

This application claims priority under 35 U.S.C. § 119 to Korean Application No. 10-2018-0067878 filed on Jun. 14, 2018, whose entire disclosure is hereby incorporated by reference.

BACKGROUND

1. Field

The present description relates to a mobile robot and an operation method thereof, and more particularly, to a mobile robot capable of providing a guidance service and an operation method thereof.

2. Background

In public places such as airports, railway stations, harbors, department stores, and theaters, information is provided to users through electronic boards and guide boards. However, the electronic boards, the guide boards, and the like merely transfer some information selected by the service provider in a unidirectional manner, and cannot meet the demands of individual users.

Meanwhile, in recent years, the introduction of kiosks for providing information and services to users using multimedia devices such as display means, touch screens, and speakers is increasing. However, even in this case, since the user has to operate the kiosk directly, there is a problem that a user who has difficulty in using such a device is inconvenient to use the device and cannot actively respond to a request of the user.

On the other hand, robots have been developed for industrial use and have been in charge of a part of factory automation. In recent years, with the expansion of robot applications, medical robots, aerospace robots, and the like have been developed, and household robots that can be used in ordinary homes are being developed.

Therefore, research on ways to provide various services such as guidance and advertisement in public places using robots is increasing. On the other hand, a mobile robot is capable of moving by itself, is free to move, and has a plurality of means for avoiding obstacles during traveling to travel while avoiding obstacles and cliffs.

For example, Korean Patent Publication No. 10-2013-0141979 discloses a mobile robot having a light source unit for irradiating light in a cross pattern and a camera unit for acquiring a forward image. An infrared sensor or an ultrasonic sensor may be used to detect an obstacle of the mobile robot. The mobile robot determines the presence and distance of the obstacle through the infrared sensor, and the ultrasonic sensor emits the ultrasonic wave at predetermined intervals. When there is an ultrasonic wave reflected by the obstacle, the mobile robot determines a distance with respect to the obstacle using a time difference between a time point at which the ultrasonic wave is emitted and a time point at which a reflected ultrasonic wave arrives.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
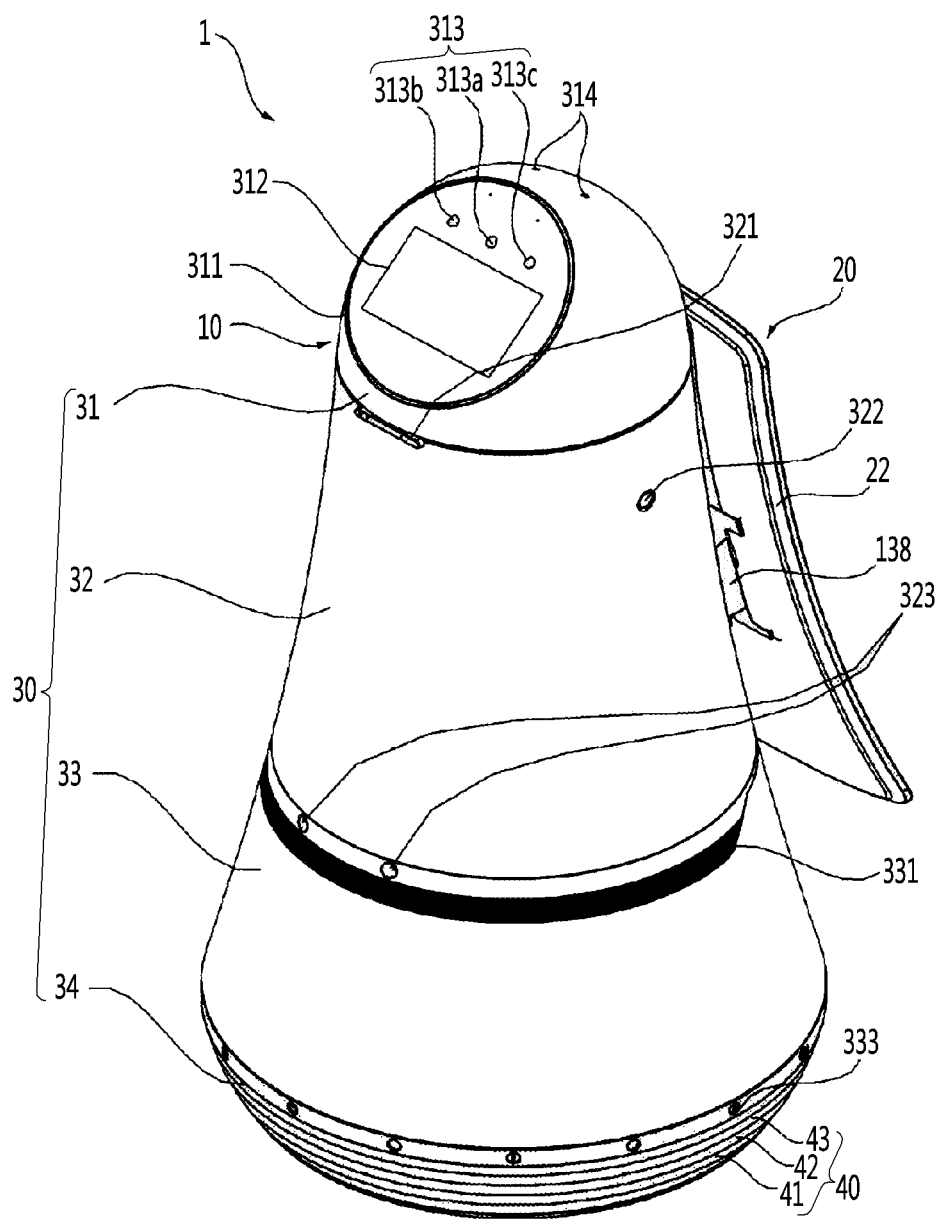
FIG. 1 is a perspective view of a mobile robot according to an embodiment of the present description.

Hereinafter, embodiments of the present description will be described in detail with reference to the accompanying drawings. However, it should be understood that the present description is not limited to these embodiments and various changes and modifications may be made. In the drawings, a part not related to the description in order to clearly describe the present description is omitted and the same reference numerals are used for the same or similar parts throughout the specification for consistency.

In the subsequent description, the elements used to represent such suffixes 'module' or 'part' has been described only in favor of the present description, in itself no specific meaning. Thus, the 'module' and 'part' may be used mixed. It can be appreciated that, although such terms as first, second, etc. may be used herein to describe various elements, these elements should not be limited by these terms. These terms are only used to distinguish one (1) element from another element.

Figure 2:
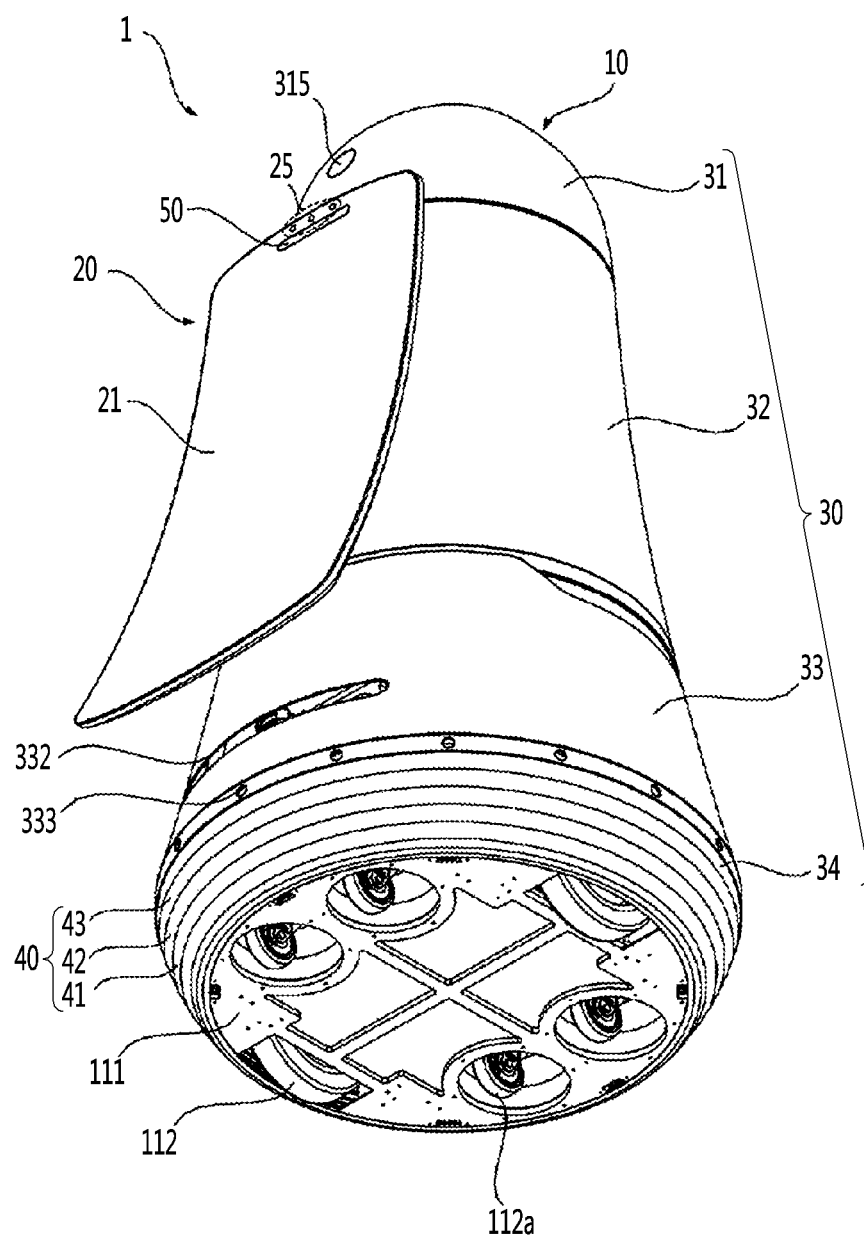
FIG. 2 is a bottom perspective view when a mobile robot is viewed from the bottom according to an embodiment of the present description.
Figure 3:
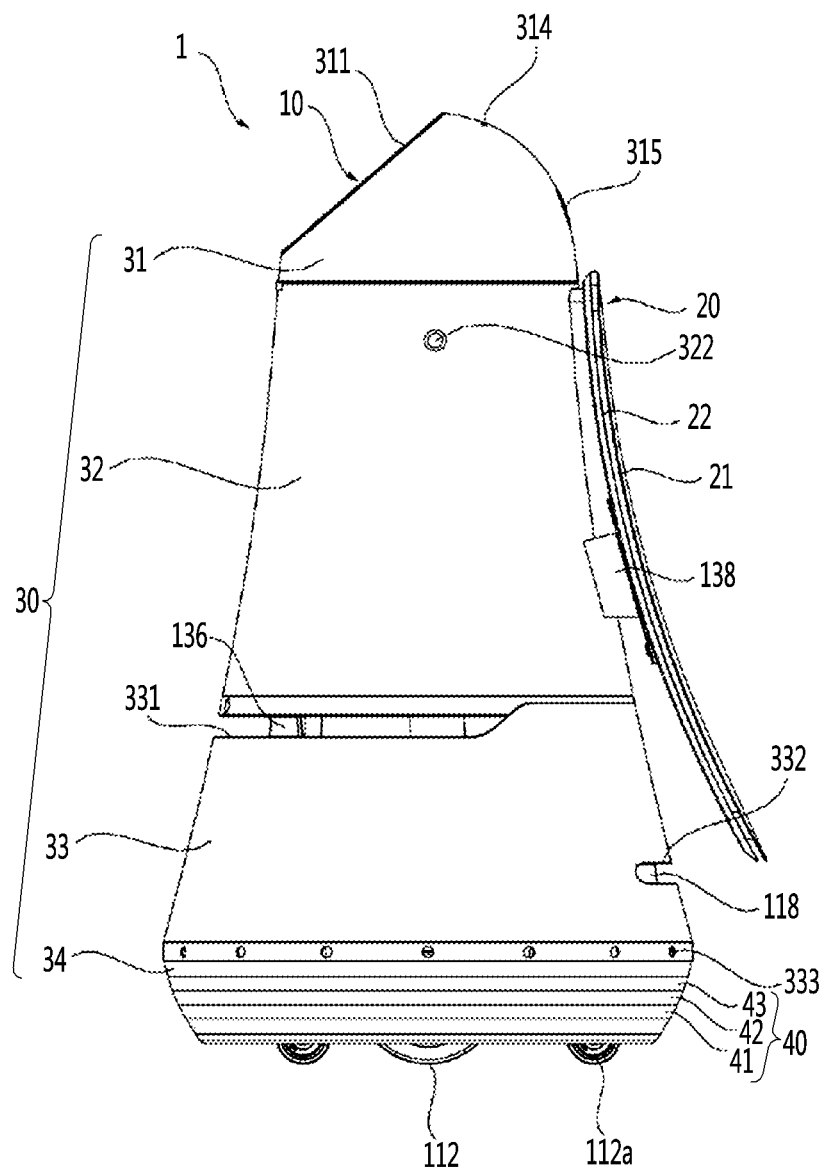
FIG. 3 is a side view of a mobile robot according to an embodiment of the present description.

FIG. 1 is a perspective view of a mobile robot according to an embodiment of the present description, FIG. 2 is a bottom perspective view of the mobile robot, and FIG. 3 is a side view of the mobile robot. Referring to FIGS. 1 to 3, a mobile robot 1 according to an embodiment of the present description may include a main body 10 that forms an outer appearance and houses various parts therein.

The main body 10 may have a long length in a vertical direction and may have a roly-poly toy shape which becomes thinner as it goes up from the lower part to the upper part as a whole. The main body 10 may include a case 30 forming an outer appearance of the mobile robot 1. The case 30 may include a top cover 31 disposed on the upper side, a first middle cover 32 disposed under the top cover 31, a second middle cover 33 under the first middle cover 32, and a bottom cover 34 disposed under the second middle cover 33. The first middle cover 32 and the second middle cover 33 may be formed to be a single middle cover.

The top cover 31 is disposed at the uppermost end of the mobile robot 1 and may have a hemispherical shape or a dome shape. The top cover 31 may be disposed at a lower height than an adult's height for easy input of commands from a user. The top cover 31 may be formed to rotate at a predetermined angle.

On the other hand, the top cover 31 may be disposed at the uppermost end of the mobile robot 1 and may accommodate various parts therein. In addition, the top cover 31 may have a shape and function similar to those of a human head and take charge of interaction with a user. Therefore, the top cover 31 and the parts disposed therein may be referred to as a head. Further, the configurations of the parts accommodated in the top cover 31 or disposed outside may be referred to as a head part. On the other hand, the remaining portion disposed under the head may be referred to as a body.

The top cover 31 may include an operation part 311 on one side of a front surface thereof. The operation part 311 may perform a function of receiving a command from a user. To this end, the operation part 311 may include a display 312 for receiving a touch input from a user.

The display 312 disposed in the operation part 311 may be referred to as a first display or a head display 312 and a display included in a display unit 20 disposed in the body may be referred to as a second display or a body display 21. The head display 312 may be configured as a touch screen in which a touch pad is layered therein. In this case, the head display 312 may be used as an input device capable of inputting information by a user's touch in addition to an output device.

In addition, the operation part 311 may be directed upward by a certain angle such that the user may easily operate while viewing the head display 312 downward. For example, the operation part 311 may be disposed on a surface of the top cover 31, which is formed by cutting a part of the top cover 31. Accordingly, the head display 312 may be arranged to be inclined.

In addition, the operation part 311 may have a circular or elliptical shape as a whole. The operation part 311 may be implemented similarly to a face shape of a human. As an example, the operation part 311 may have a circular shape, and one or more structures for expressing the eyes, nose, mouth, eyebrows, and the like of a human may be disposed on the operation part 311.

That is, a specific structure may be arranged on the operation part 311 to express a human's eyes, nose, mouth, eyebrows or the like, or a specific paint may be painted. Therefore, the operation part 311 may have a human's face features, thereby providing the user with an emotional feeling. Furthermore, when a robot having a human's face features travels, it is possible to give a feeling that a human is moving, thereby relieving the sense of resistance to the robot. As another example, one or more images for expressing a human's eyes, nose, mouth, eyebrows, and the like may be displayed on the head display 312.

That is, on the head display 312, not only information related to a route guidance service but also various images for expressing a human's face features may be displayed. On the head display 312, an image for expressing a predetermined facial expression may be displayed at predetermined time intervals or at a specific time point. On the other hand, the direction in which the body display 21 faces is defined as a "rear direction" In addition, the opposite direction to the "rear direction is defined as a "front direction".

The operation part 311 may be provided with a head camera unit 313 for recognizing people and objects. The head camera unit 313 may be disposed on the upper side of the head display 312. The head camera unit 313 may include a two-dimensional (2D) camera 313a and RGBD sensors 313b and 313c.

The 2D camera 313a may be a sensor for recognizing a human or an object based on a two-dimensional image. Also, the RGBD (Red, Green, Blue, Distance) sensors 313b and 313c may be sensors for acquiring a human's position or a face image. The RGBD sensors 313b and 313c may be sensors for detecting a human or an object using captured images having depth data obtained from a camera having RGBD sensors or another similar 3D imaging device.

In order to accurately detect a human's position or a face image, the RGBD sensors 313b and 313c may be plural. For example, the two RGBD sensors 313b and 313c may be disposed on the left and right sides of the 2D camera 313a.

The head camera unit 313 may be configured by a 3D vision sensor such as an RGBD camera sensor, and may sense whether a person is present within a predetermined distance, whether a guidance target is present in a guidance mode, a distance between a person and the mobile robot 1, a moving speed of a person or the like. Meanwhile, although not shown, the operation part 311 may further include a physical button for directly receiving a command from a user.

In addition, the top cover 31 may further include a microphone 314. The microphone 314 may perform a function of receiving a command of an audio signal from a user. For example, the microphone 314 may be formed at four points in the upper portion of the top cover 31 to correctly receive voice commands from the user. Therefore, even when the mobile robot 1 is traveling or the top cover 31 is rotating, it is possible to accurately receive a request for route guidance by the voice from the user.

In one embodiment of the present description, the top cover 31 may be rotated such that the operation part 311 faces the traveling direction while the mobile robot 1 is traveling. When the mobile robot 1 receives a command (e.g., a voice command) from the user while the mobile robot 1 is traveling, the top cover 31 may be rotated such that the operation part 311 faces the direction in which the user is located.

Alternatively, the top cover 31 may be rotated in a direction opposite to the traveling direction of the mobile robot 1 when the mobile robot 1 receives a command from the user while the mobile robot 1 is traveling. That is, the top cover 31 may be rotated in a direction which the body display unit 20 faces. Accordingly, the user may operate the operation part 311 effectively while looking at route guidance service information or the like displayed on the body display unit 20.

Figure 4:
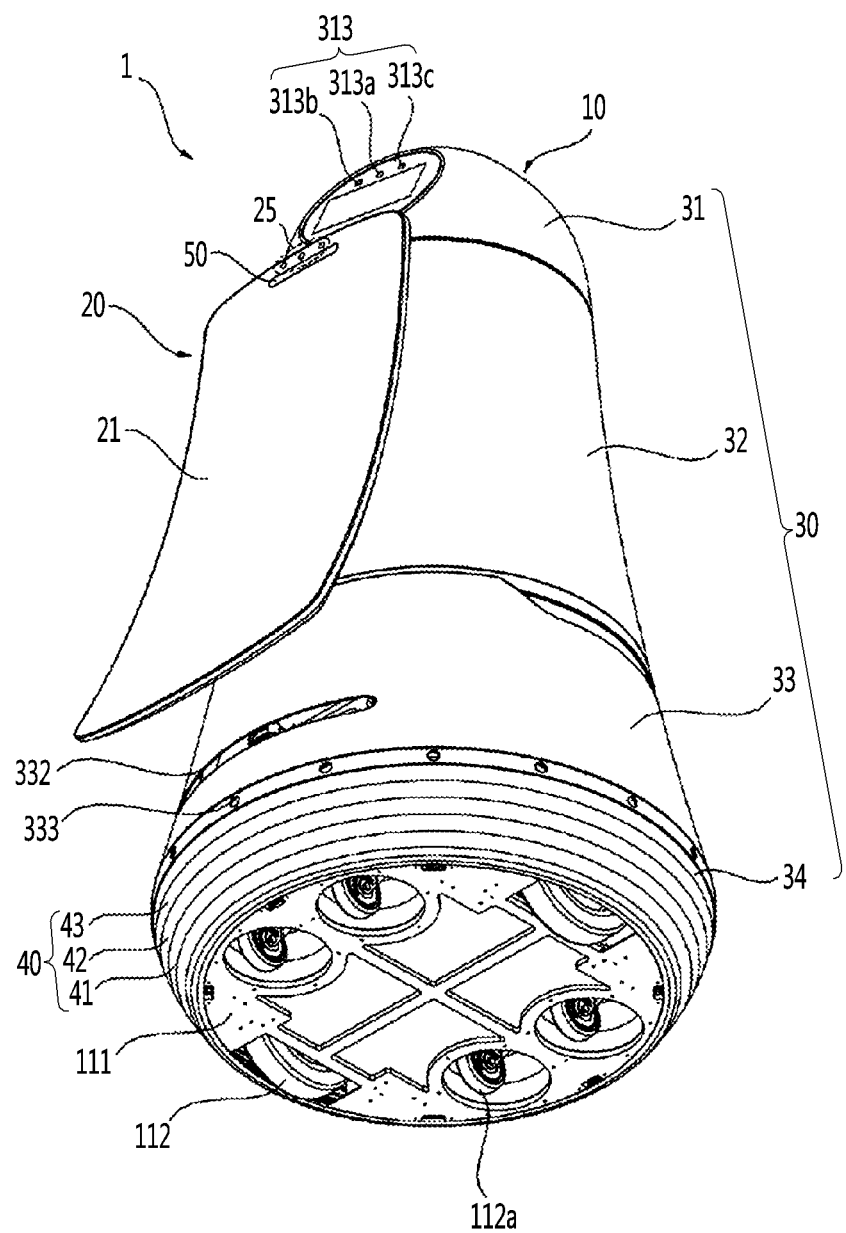
FIG. 4 is a view illustrating arrangement of displays of a mobile robot according to an embodiment of the present description.

FIG. 4 is a view showing arrangement of the displays 312 and 20 of the mobile robot 1 according to an embodiment of the present description. Referring to 4, when the mobile robot 1 receives a command from a user in an interaction state or is in a standby state, the displays 312 and 20 may align in one direction, thus allowing users in a public place to more easily look at information displayed on the displays 312 and 20.

The interaction state may be a state in which the mobile robot 1 is providing a voice guidance, a menu screen, or the like to a certain user, a state in which the mobile robot 1 is receiving a touch or voice input from the user, or a state in which the mobile robot 1 is providing a guidance service.

On the other hand, the facing direction of the operation part 311 and the body display unit 20 may be opposite to each other. In this case, for example, the operation part 311 may be oriented toward one direction and the display unit 20 may be oriented toward the other direction opposite to the one direction. Therefore, information displayed on the operation part 311 and the body display unit 20 may be viewed from both directions.

The directions in which the operation part 311 and the body display unit 20 are oriented may be changed when the mobile robot 1 is traveling or stopped. For example, when the mobile robot 1 is traveling, the directions in which the operation part 311 and the body display unit 20 are oriented may be opposite to each other, as illustrated in FIG. 1. In addition, when the mobile robot 1 is in a standby state, the directions in which the operation part 311 and the body display unit 20 are oriented may be identical to each other as illustrated in FIG. 4.

In addition, the top cover 31 may further include an emergency operation button 315. The emergency operation button 315 may perform a function of immediately stopping the operation of the mobile robot 1 while the mobile robot 1 is stopped or traveling. For example, the emergency operation button 315 may be disposed in the rear portion of the mobile robot 1 so as to allow the emergency operation button 315 to be operated easily even when the mobile robot 1 travels forward.

The first middle cover 32 may be disposed under the top cover 31. Various electronic parts including a substrate may be disposed inside the first middle cover 33. The first middle cover 32 may have a cylindrical shape having a larger diameter as it goes downward from the upper portion.

More preferably, the first middle cover 32 may include the RGBD sensor 321. The RGBD sensor 321 may detect a collision between the mobile robot 1 and an obstacle while the mobile robot 1 is traveling. To this end, the RGBD sensor 321 may be disposed in a direction in which the mobile robot 1 travels, that is, in the front portion of the first middle cover 32. For example, the RGBD sensor 321 may be disposed at the upper end of the first middle cover 32, taking into account the height of an obstacle or a human existing in front of the mobile robot 1. However, the present description is not limited thereto, and the RGBD sensor 321 may be disposed at various positions in the front portion of the first middle cover 32.

According to an embodiment, the RGBD sensor 321 may be configured by a 3D vision sensor, and may sense whether a person is present within a predetermined distance, whether a guidance target is present in a guidance mode, a distance between a person and the mobile robot 1, a moving speed of a person or the like. Depending on embodiments, the RGBD sensor 321 may not disposed in the first middle cover 32 and the function of the RGBD sensor 321 may be performed by the head camera unit 313.

The first middle cover 32 may further include a speaker hole 322. The speaker hole 322 may be a hole for transferring sound generated from the speaker to the outside. The speaker hole 322 may be formed on the outer peripheral surface of the first middle cover 32, and a single speaker hole 322 may be formed. Alternatively, a plurality of speaker holes 322 may be formed on the outer peripheral surface of the first middle cover 32 to be spaced apart from each other.

The first middle cover 32 may further include a stereo camera hole 323. The stereo camera hole 323 may be a hole for operation of a stereo camera (not shown) mounted inside the main body 10. For example, the stereo camera hole 323 may be formed at a lower front end of the first middle cover 32. Accordingly, the stereo camera may photograph the front area of the mobile robot 1 through the stereo camera hole 323.

The second middle cover 33 may be disposed under the first middle cover 32. A battery, a light detection and ranging (Lidar) sensor for autonomous traveling, and the like may be disposed inside the second middle cover 33. Like the first middle cover 32, the second middle cover 33 may have a cylindrical shape having a larger diameter as it goes downward from the upper portion. The outer side of the second middle cover (33) may be coupled to the outer side of the first middle cover (32) without a step. That is, since the outer side of the second middle cover 33 and the outer side of the first middle cover 32 may be smoothly coupled, the appearance of the second middle cover 33 may look beautiful.

Further, the first middle cover 32 and the second middle cover 33 have a cylindrical shape having a larger diameter as it goes downward from the upper portion, and therefore the first middle cover 32 and the second middle cover 33 may have a roly-poly toy shape as a whole. Therefore, the impact occurring when the main body 10 collides with a human or an obstacle may be alleviated.

Specifically, the second middle cover 33 may include a first cutout 331. The first cutout 331 may be formed over the front portion and side portion of the outer peripheral surface of the second middle cover 33. The first cutout 331 may be a portion cut from the second middle cover 33 such that a front Lidar 136, which will be described later, is operable.

Specifically, the first cutout 331 may be cut to a predetermined length in a radial direction from the outer peripheral surface of the second middle cover 33 on the front side. The front Lidar 136 is disposed inside the second middle cover 33. The first cutout 331 may be formed by cutting the outer peripheral surface of the second middle cover 33 corresponding to the position of the front Lidar 136 along a periphery of the second middle cover 33. That is, the first cutout 331 and the front Lidar 136 may face each other. Therefore, the front Lidar 136 may be exposed to the outside by the first cutout 331.

For example, the first cutout 331 may be formed by cutting the front portion of the second middle cover 33 along the periphery by 270 degrees. The reason why the first cutout 331 is formed in the second middle cover 33 is to prevent laser emitted from the front Lidar 136 from being directly irradiated to the eyes of an adult or a child.

In addition, the second middle cover 33 may further include a second cutout 332. The second cut portion 332 may be formed over the rear portion to side portion of the outer peripheral surface of the second middle cover 33. The second cutout 332 is a portion cut from the second middle cover 33 such that a rear Lidar 118, which will be described later, is operable.

Specifically, the second cutout 332 may be cut to a predetermined length in a radial direction from the outer peripheral surface of the second middle cover 33 on the rear side. The rear Lidar 118 is disposed inside the second middle cover 33. The second cutout 332 may be formed by cutting the outer peripheral surface of the second middle cover 33 from a position corresponding to the position of the rear Lidar 118 along the periphery thereof. Therefore, the rear Lidar 118 may be exposed to the outside by the second cutout 332. For example, the second cutout 332 may be formed by cutting the rear portion of the second middle cover 33 along the periphery by 130 degrees.

In the present embodiment, the first cutout 331 may be spaced apart from the second cutout 332 in the vertical direction so as not to be coupled thereto. The first cutout 331 may be disposed higher than the second cutout 332.

When the first cutout 331 and the second cutout 332 are located on the same line, laser emitted from the Lidar of one mobile robot may be irradiated to a Lidar of another mobile robot. In this case, the lasers respectively emitted from the Lidars of the mobile robots may interfere with each other thereby causing accurate distance detection to be difficult. In this case, since it is impossible to detect a distance between the mobile robot and an obstacle, normal traveling may be difficult and a problem that the mobile robot and the obstacle collide with each other may occur.

Further, the second middle cover 33 may be further provided with an ultrasonic sensor 333. The ultrasonic sensor 333 may be a sensor for measuring a distance between an obstacle and the mobile robot 1 using an ultrasonic signal. The ultrasonic sensor 333 may perform a function of detecting an obstacle close to the mobile robot 1.

For example, the ultrasonic sensor 333 may be configured by several sensors to detect obstacles close to the mobile robot 1 in all directions. The plurality of ultrasonic sensors 333 may be spaced apart from each other in the lower end of the second middle cover 33 along the periphery.

The bottom cover 34 may be disposed under the second middle cover 33. A wheel 112, a caster 112a, and the like may be disposed inside the bottom cover. Unlike the first middle cover 32 and the second middle cover 33, the bottom cover 34 may have a cylindrical shape having a smaller diameter as it goes downward from the upper portion. That is, the main body 10 has a roly-poly toy shape as a whole to reduce the amount of impact applied when the robot is in a collision state, and the lower end of the main body 10 has an inward tapered structure to prevent a human foot from being caught by the wheel of the robot.

Specifically, a base 111 may be disposed inside the bottom cover 34. The base 111 may form a bottom surface of the mobile robot 1. The base 111 may be provided with wheels 112 for traveling of the mobile robot 1. The wheels 112 may be positioned on the left and right sides of the base 111, respectively.

In addition, the base 111 may be provided with the caster 112a for assisting the traveling of the mobile robot 1. Here, the caster 112a may be composed of a plurality of casters for manual movement of the mobile robot 1. For example, two casters 112a may be positioned in each of the front portion and rear portion of the base 111. According to the above-described caster structure, when the power supply of the mobile robot 1 is turned off or the mobile robot 1 is to be manually moved, the mobile robot 1 may be pushed and moved without applying a large force.

The bottom cover 34 may be provided with light emitting modules 40 each including one or more light emitting diodes (LEDs), and at least one of the light emitting modules 40 may be turned on or off according to the operation state of the mobile robot. For example, at least one of the light emitting modules 40 may output light of a predetermined color or may blink at predetermined cycles according to an operation state of the mobile robot. In addition, two or more light emitting modules among the light emitting modules 40 may output light in a predetermined pattern according to the operation state of the mobile robot.

The light emitting modules 40 each may include one or more light emitting diodes as a light source. When a plurality of light sources are provided, the plurality of light sources may be arranged with a constant pitch for supply of uniform light. The number of light sources and the pitch may be set in consideration of the light intensity. Further, the plurality of light sources may be white in color, or the colors of adjacent light sources may be mixed to emit white light.

The light source may include not only a single light emitting diode but also an aggregate in which a plurality of light emitting diodes are arranged close to each other. It is also possible to include, for example, a case in which red, blue, and green light emitting diodes, which are three primary colors of light, are disposed close to each other.

Preferably, the light emitting modules 40 may be disposed along the periphery of the bottom cover 34. For example, the light emitting modules 40 may be disposed on a certain circle that surrounds the periphery of the bottom cover 34 in the horizontal direction.

The light emitting modules 40 may be disposed in the bottom cover 34 that is the lower end of the mobile robot 1, so that the light emitting modules 40 may be disposed at a position considerably lower than a human eye level. Accordingly, when the light emitting modules 40 continuously output a specific light or blink, people may feel less glare.

The light emitting modules 40 are arranged so as to surround the periphery of the bottom cover 34 in the horizontal direction, so that people may see light emitted from the light emitting modules 40 in any direction of 360 degrees. The light emitting modules 40 are disposed in the bottom cover 34 to be spaced apart from the body display 21, which displays a predetermined image. Accordingly, it is possible to prevent the output light of the light emitting modules 40 and the output image of the body display 21 from deteriorating visibility of each other.

In addition, the light emitting modules 40 may have a plurality of rows and may be arranged in multiple stages. Accordingly, visibility of light output by the light emitting modules 40 may be further improved. For example, the light emitting modules 40 may be arranged in three rows 41, 42, and 43 with different lengths. In this case, the row 41 of the three rows 41, 42, and 43, located at the lowermost end may have the shortest length.

More preferably, the light emitting modules 40 may be arranged to have a plurality of rows and columns. For example, the light emitting modules 40 may be arranged in the three rows 41, 42 and 43, and each row 41, 42 and 43 may include a plurality of light emitting modules which are independently controllable. Accordingly, the light emitting modules 40 may have a plurality of rows and columns, and when the entire light emitting modules 40 are unfolded, they are arranged in the form of a matrix of M×N.

The body display unit 20 may be formed to elongate in the vertical direction on one side of the mobile robot 1. Specifically, the body display unit 20 may include a body display 21 and a support 22. The body display 21 may be positioned behind the first middle cover 32. The body display 21 may perform a function of outputting visual information (e.g., airport gate inquiry information or route guidance service information.) related to a service currently being provided.

The body display 21 may be a curved display having a shape curved outward with a predetermined curvature. That is, the body display 21 may have a concave shape as a whole. The body display 21 may have a shape that tilts backward as it goes downward from the upper portion. In other words, the body display 21 may be formed to be gradually far away from the case 30 as it goes downward from the upper portion.

According to the structure of the display unit described above, not only information displayed on the body display 21 is visible even at a position far from the mobile robot 1 but also the information displayed on the body display 21 is viewed as not being distorted at various angles.

In addition, according to the embodiment of the present description, the mobile robot 1 may move along a set route to guide the user to the route. A user may see the body display unit 20 mounted on the rear portion of the mobile robot 1 while moving along the mobile robot 1. That is, even when the mobile robot 1 travels for guiding the route, the user may easily see the information displayed on the body display unit 20 while following the mobile robot 1.

The upper end of the body display 21 may extend to the upper end of the first middle cover 32 and the lower end of the body display 21 may extend to the second cutout 332. In the present embodiment, the lower end of the body display 21 may need to be formed not to extend beyond the second cutout 332. When the body display 21 is formed to cover the second cutout 332, the laser emitted from the rear Lidar 118 may hit against the lower end of the body display 21. In this case, a problem that the mobile robot 1 may not be able to detect a distance to an obstacle located behind may occur.

Meanwhile, the support 22 may function to hold the body display 21 to be positioned behind the first middle cover 32. The support 22 may extend from a rear surface of the body display unit 21. The support 22 may be formed to elongate in the vertical direction on the rear surface of the body display 21 and may protrude further downward from the upper portion.

The support 22 may be inserted into the first middle cover 32 through the rear portion of the first middle cover 32. To this end, a through hole (not shown) through which the support 22 passes may be formed in the rear portion of the first middle cover 32. The through hole may be formed by cutting a part on the rear side of the outer peripheral surface of the first middle cover 32.

The body display unit 20 may be fixed to the inside of the main body 10 by a separate fixing member 138. The fixing member 138 for fixing the body display unit 20 to the main body 10 may be provided in the main body 10. One side of the fixing member 138 may be fixed to the body 10 and the other side thereof may be fixed to the body display unit 20. To this end, the other side of the fixing member 138 may protrude to the outside of the case 30 by passing through the through hole. That is, the support 22 and the fixing member 138 may be positioned together in the through hole.

In the present embodiment, the body display unit 20 may be fastened to the fixing member 138 by fastening means. In this case, the support 22 of the body display unit 20 may be placed on the fixing member 138. In other words, the support 22 may be mounted on the fixing member 138, and a part of the fixing member 138 may be fixed to a part of the body display unit 20. With such a fixing structure for the display unit, the body display unit 20 may be stably positioned at the rear of the first middle cover 32.

In addition, the body display unit 20 may further include a ticket input port 50. Although the ticket input port 50 is illustrated as being disposed in the body display unit 20 in the present embodiment, the present description is not limited thereto. The ticket input port 50 may be disposed in another portion of the mobile robot 1.

Meanwhile, the mobile robot 1 may include a scanner (not shown) for scanning a ticket inserted into the ticket input port 50, and the scanner may be activated under the control of a control unit 740. According to an embodiment of the present description, when a ticket such as an airline ticket or a baggage ticket is inserted into the ticket input port 50, the scanner provided inside the mobile robot 1 may scan a bar code, a QR code contained in the ticket.

In addition, the mobile robot 1 may display a scan result on the body display 21, and provide a user with gate information, counter information, or the like according to the scan result.

The body display unit 20 may further include a body camera unit 25 for identifying and tracking a guidance object. The body camera unit 25 may be configured by a 3D vision sensor such as an RGBD camera sensor, and may sense whether a person is present within a predetermined distance, whether a guidance target is present in a guidance mode, a distance between a person and the mobile robot 1, a moving speed of a person or the like. According to embodiments, the mobile robot 1 may not include the body camera unit 25, but may further include a sensor for identifying and tracking a guidance target disposed at another portion.

Figure 5:
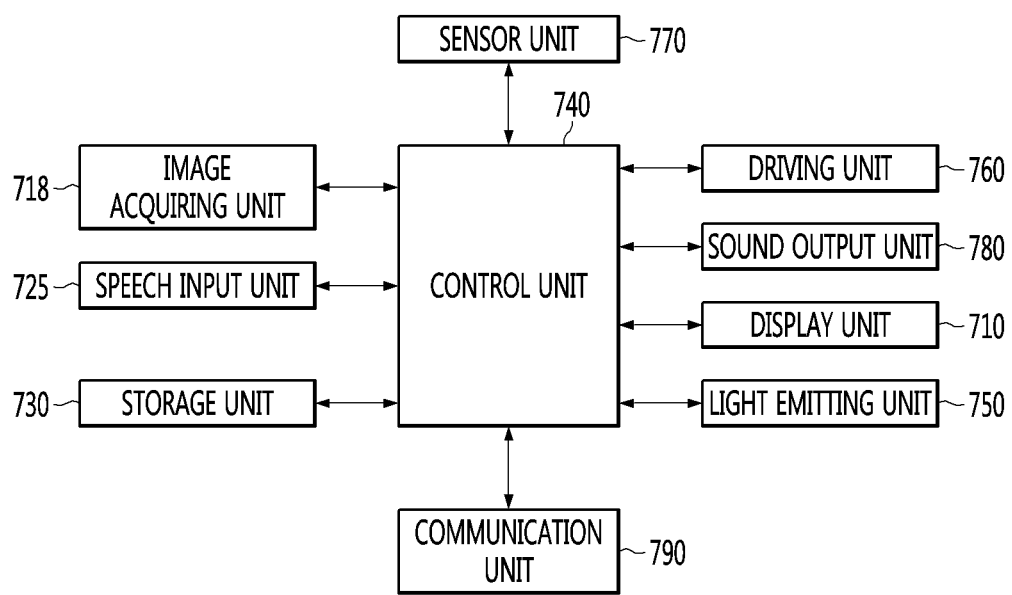
FIG. 5 is a block diagram illustrating a control relationship between main components of a mobile robot according to an embodiment of the present description.

FIG. 5 is a block diagram illustrating a control relationship between main components of a mobile robot according to an embodiment of the present description. Referring to FIG. 5, a mobile robot 1 according to an embodiment of the present description may include a speech input unit 725 for receiving a user's speech input through a microphone 314, a storage unit 730 for storing various data, a communication unit 790 for transmitting/receiving data to/from another electronic device such as a server (not shown), a light emitting unit 750 including at least one light emitting module for outputting light to the outside, and a control unit 740 for controlling overall operation of the mobile robot 1.

The speech input unit 725 may include a processor that converts analog sound into digital data or may be connected to the processor to convert the user input speech signal into data to be recognized by the control unit 740 or a server (not shown). The control unit 740 may control the speech input unit 725, the storage unit 730, the light emitting unit 750, the communication unit 790 and the like constituting the mobile robot 1 to control the overall operation of the mobile robot 1.

The storage unit 730 may record various kinds of information necessary for controlling the mobile robot 1, and may include a volatile or nonvolatile recording medium. The recording medium may store data that is readable by a microprocessor, and may include a hard disk drive (HDD), a solid state disk (SSD), a silicon disk drive (SDD), a ROM, a RAM, a CD-ROM, magnetic tape, floppy disk, optical data storage, and the like. In addition, the storage unit 730 may store various data necessary for the mobile robot 1 to provide a guidance service.

Also, the control unit 740 may transmit an operation state of the mobile robot 1, a user input, or the like to the server through the communication unit 790. The communication unit 790 may include at least one communication module to allow the mobile robot 1 to be connected to the Internet or a predetermined network.

Meanwhile, data for speech recognition may be stored in the storage unit 730, and the control unit 740 may process a speech input signal of the user received through the speech input unit 725 and perform a speech recognition process. On the other hand, the control unit 740 may allow the mobile robot 1 to perform a predetermined operation based on a result of the speech recognition.

For example, when a command contained in the speech signal is a command for requesting predetermined information such as flight start information and sightseeing guide information, the control unit 740 may allow the display unit 710 to display the predetermined information such as flight start information and sightseeing guide information.

In addition, when there is a guide request from a user, the control unit 740 may allow the mobile robot 1 to escort the user to a guidance destination selected by the user. On the other hand, the speech recognition process may be performed in the server, not in the mobile robot 1 itself. In this case, the control unit 740 may allow the communication unit 790 to transmit the user input speech signal to the server, and may receive a recognition result of the speech signal from the server through the communication unit 790. Alternatively, the mobile robot 1 may perform simple speech recognition such as recognition of a call, and high-dimensional speech recognition such as natural language processing may be performed in the server.

Meanwhile, the mobile robot 1 may include a display unit 710 that displays predetermined information as an image and a sound output unit 780 that outputs predetermined information as an acoustic signal. The display unit 710 may display information corresponding to a request input by a user, a processing result corresponding to a request input by the user, an operation mode, an operation state, an error state, and the like.

As described above with reference to FIGS. 1 to 4, the display unit 710 may include the head display 312 and the body display 21. Since the body display 21 is relatively larger in size than the head display 312, it may be preferable to display the information on the body display 21 in a large screen.

In addition, the sound output unit 780 may output an alert sound, a notification message such as an operation mode, an operation state, or an error state, information corresponding to a request input by the user, a processing result corresponding to a request input by the user, and the like, in an acoustic manner. The sound output unit 780 may convert an electrical signal from the control unit 740 into an audio signal and output it. For this purpose, a speaker or the like may be provided.

Meanwhile, the mobile robot 1 may include an image acquiring unit 718 capable of photographing a predetermined range. The image acquiring unit 718 photographs surroundings of the mobile robot 1, external environment, and the like, and may include a camera module. Several cameras may be installed for each part of the mobile robot 1 for photographing efficiency.

For example, as described above with reference to FIGS. 1 to 4, the image acquiring unit 718 may include a head camera unit 313 for recognizing a person and an object, and a body camera unit (25) for identifying and tracking a guidance target. However, the number, arrangement, type, and photographing range of the cameras included in the image acquiring unit 718 are not necessarily limited thereto.

The image acquiring unit 718 may photograph an image for user recognition. The control unit (or controller) 740 may determine an external situation or recognize a user (guidance target) based on the image acquired by the photographing of the image acquiring unit 718. Also, the control unit 740 may allow the mobile robot 1 to travel based on the image acquired by the photographing of the image acquiring unit 718. The control unit 740 may include at least one processor to perform computations related to executing software instructions related to controlling the various components of the robot 1, as described herein.

Meanwhile, the image acquired by the photographing of the image acquiring unit 718 may be stored in the storage unit 730. Meanwhile, the mobile robot 1 may include a driving unit 760 for moving, and the driving unit 760 may move the main body 10 under the control of the control unit 740.

The driving unit 760 may include one or more driving wheels 112 for moving the main body 10 of the mobile robot 1. The driving unit 760 may include a driving motor (not shown) connected to the driving wheels 112 to rotate the driving wheels. The driving wheels 112 may be provided on the left and right sides of the main body 10, respectively, and will be referred to as left and right wheels, respectively.

The left wheel and the right wheel may be driven by a single drive motor, but a left wheel driving motor for driving the left wheel and a right wheel driving motor for driving the right wheel may be provided if necessary. The traveling direction of the main body 10 may be changed to the left or right side by making a difference in the rotation speeds of the left and right wheels.

Meanwhile, the mobile robot 1 may include a sensor unit 770 including sensors for sensing various data related to the operation and state of the mobile robot 1. The sensor unit 770 may include an obstacle detection sensor that detects an obstacle. The obstacle detection sensor may include an infrared sensor, an ultrasonic sensor, an RF sensor, a geomagnetic sensor, a position sensitive device (PSD) sensor, or the like. For example, the obstacle detection sensor may correspond to the ultrasonic sensor 333, the RGBD sensor 321, and the like described above with reference to FIGS. 1 to 4. In addition, the sensor unit 770 may further include a cliff detection sensor 113 that detects the presence or absence of a cliff on the floor in a traveling area.

According to an embodiment, the sensor unit 770 may further include a sensor that senses a size (e.g., volume) of a sound obtained through the microphone 314, and therefore, sense a size of a speech uttered by the user, a size of ambient noise. Alternatively, the speech input unit 725 may determine the size of the user's speech or the ambient noise in a process of processing the signal obtained through the microphone 314, without further including a separate sensor.

In addition, the sensor unit 770 may include Lidars (light detection and ranging) sensors 136 and 118. The Lidars 136 and 118 may detect an object such as an obstacle based on a TOF (Time of Flight) of a transmission signal and a reception signal or a phase difference between a transmission signal and a reception signal using a laser light as a medium.

Further, the Lidars 132a and 132b may detect a distance to the object, a relative speed with respect to the object, and a position of the object. The Lidars 132a and 132b may be provided as a part of the configuration of the obstacle detection sensor. Also, the Lidars 132a and 132b may be provided as a sensor for creating a map.

On the other hand, the obstacle detection sensor may detect an object, particularly an obstacle, existing in a traveling direction (movement direction) of the mobile robot, and transmit obstacle information to the control unit 740. In this case, the control unit 740 may control the movement of the mobile robot 1 according to a position of the detected obstacle.

The sensor unit 770 may further include a motion detection sensor that detects a motion of the mobile robot 1 according to driving of the main body 101 and outputs motion information. For example, a gyro sensor, a wheel sensor, an acceleration sensor, or the like may be used as the motion detection sensor.

The gyro sensor may sense a rotation direction and detect a rotation angle when the mobile robot 1 moves according to an operation mode. The gyro sensor may detect an angular velocity of the mobile robot 1 and output a voltage value proportional to the angular velocity. The control unit 740 may calculate a rotation direction and a rotation angle using the voltage value output from the gyro sensor.

The wheel sensor is connected to the left and right wheels to detect the numbers of rotations of the wheels. In this case, the wheel sensor may be a rotary encoder. The rotary encoder may sense and output the numbers of rotations of the left and right wheels.

The control unit 740 may calculate rotation speeds of the left and right wheels using the numbers of the rotations. Also, the control unit 740 may calculate a rotation angle using a difference in the numbers of rotations of the left and right wheels.

The acceleration sensor may detect a change in the speed of the mobile robot 1, for example, a change in the mobile robot 1 caused due to start, stop, and direction change, collision with an object or the like. The acceleration sensor may be attached to a position adjacent to a main wheel or an auxiliary wheel to detect the slip or idling of the wheel.

In addition, the acceleration sensor may be built in the control unit 740 to detect a change in the speed of the mobile robot 1. That is, the acceleration sensor may detect the amount of impact according to the change in the speed and output a voltage value corresponding to the amount of impact. Thus, the acceleration sensor may perform the function of an electronic bumper.

The control unit 740 may calculate the positional change of the mobile robot 1 based on the operation information output from the motion detection sensor. The position of the mobile robot 1 may be a relative position with respect to an absolute position using image information. The mobile robot may improve the performance of the position recognition using the image information and the obstacle information through recognition of the relative position.

The light emitting unit 750 may include a plurality of light emitting modules. For example, as described with reference to FIGS. 1 to 4, the light emitting portion 750 may include light emitting modules 40 each including one or more light emitting diodes (LEDs). The light emitting modules 40 may be disposed in the bottom cover 34 and the light emitting modules 40 may be operated under the control of the control unit 740.

For example, the control unit 740 may control the light emitting modules 40 such that at least one of the light emitting modules 40 outputs light of a predetermined color or blinks at predetermined intervals according to an operation state of the mobile robot. In addition, the control unit 740 may perform control such that two or more of the light emitting modules output light in a predetermined pattern according to the operation state of the mobile robot.

As described above with reference to FIGS. 1 to 5, the mobile robot 1 according to an embodiment of the present description may include a top cover 31 provided to be rotatable, a first display 312 disposed in the top cover 31, a second display 21 having a size larger than the first display 312, middle covers 32 and 33 coupled to the second display 21 and the top cover 31, a bottom cover 34 disposed under the middle covers 32 and 33, a light emitting unit 750 including light emitting modules 40 disposed along a periphery of the bottom cover 34, and a control unit 740 that controls the light emitting modules 40 based on a current state of the mobile robot 1.

Each of the light emitting modules 40 of the light emitting unit 750 may include at least one light source. For example, the light emitting modules 40 each may include one or more light emitting diodes (LEDs). Conventional analog lighting has a limitation in precisely controlling the illuminance, but the light emitting diode (LED) may precisely control the illuminance by adjusting an amount of applied current and a width of a driving pulse. Also, when the light emitting diodes (LEDs) of R, G, and B colors are provided in a combination, light of a specific color may be provided and adjustment of a color temperature may be facilitated.

The light emitting diode (LED) may be a single color light emitting diode (LED) such as red, blue, green, and white. According to an embodiment, the light emitting diode (LED) may be a multicolor light emitting diode (LED) capable of reproducing a plurality of colors.

The light emitting modules 40 may include a plurality of light emitting diodes (LEDs), and the plurality of light emitting diodes (LEDs) may emit white light to provide white light, or red, blue, and green light emitting diodes (LEDs) may be combined to provide light of a specific color or white light.

For example, the light emitting modules 40 may output light of a first color (white) indicating a normal operation state, light of a second color (yellow) indicating a pause state, and light of a third color (red) indicating a stop and error state. The light emitting modules 40 may indicate a current operation state through output light with colors and patterns and may serve as a kind of signal light for notifying people of the traveling state and operation state of the mobile robot 1.

In addition, the control unit 740 may control the light emitting unit 750. For example, the control unit 740 may allow at least one of the light emitting modules 40 to output light of a predetermined color according to a current state of the mobile robot 1. In addition, the control unit 740 may allow at least one of the light emitting modules 40 to flicker at predetermined intervals for a predetermined time.

When a user approaches the mobile robot 1 for identification of information, input of settings, or other operation or when a child or the like touches the mobile robot 1 with curiosity during moving (traveling) of the mobile robot 1, continuous traveling of the mobile robot 1 may cause a safety accident such as a collision. In particular, public places such as airports, railway stations, terminals, department stores, and marts have a large number of floating population, and there are many unexpected variables that lead to a higher possibility of occurrence of safety accidents.

Accordingly, the mobile robot 1 according to the present description outputs light indicating a current operation state of the mobile robot 1 through the light emitting unit 750 when operating in a public place, thereby providing signal information for facilitating easy recognition of the current state of the mobile robot 1. Accordingly, it is possible to reduce the possibility of an accident between a person and the mobile robot 1 in a public place.

The light emitting modules 40 are disposed apart from the second display 21 in the bottom cover 34 at the lower end of the mobile robot 1 thereby being placed at a relatively lower position than the eye height of a human and the height of the second display 21. Accordingly, when the light emitting modules 40 continuously output the specific light or flicker, people may feel less glare, and the output light of the light emitting modules 40 and the output image of the body display 21 may be prevented from deteriorating the visibility of each other.

Preferably, the light emitting modules 40 may be disposed along the periphery of the bottom cover 34. The light emitting modules 40 are arranged so as to surround the periphery of the bottom cover 34 in the horizontal direction, so that people may see light emitted from the light emitting modules 40 in any direction of 360 degrees. Meanwhile, the light emitting modules 40 may have a plurality of rows and may be arranged in multiple stages. Accordingly, visibility of light output by the light emitting modules 40 may be further improved.

Figure 6:
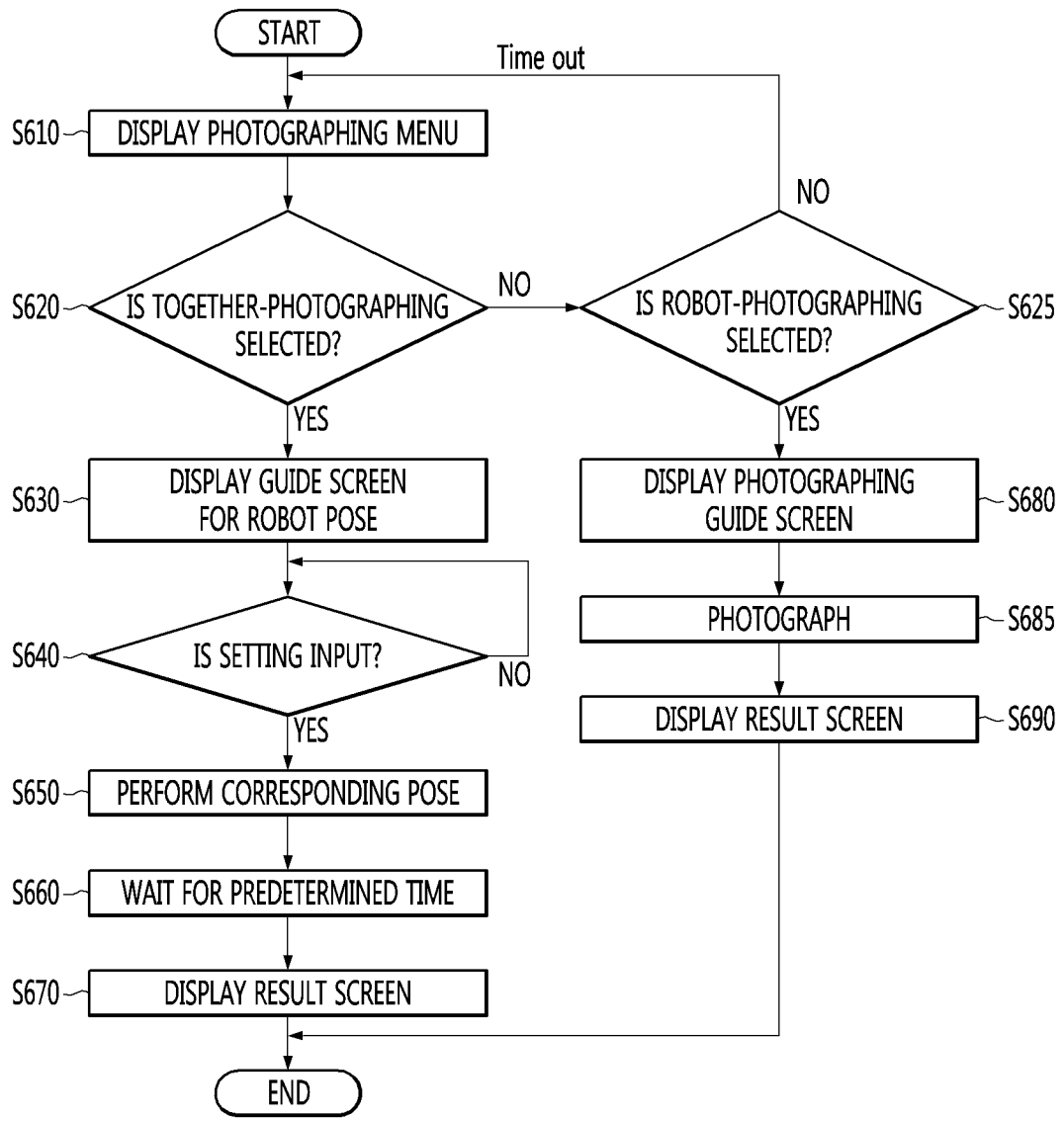
FIG. 6 is a flowchart illustrating a method of operating a mobile robot according to an embodiment of the present description.
Figure 7:
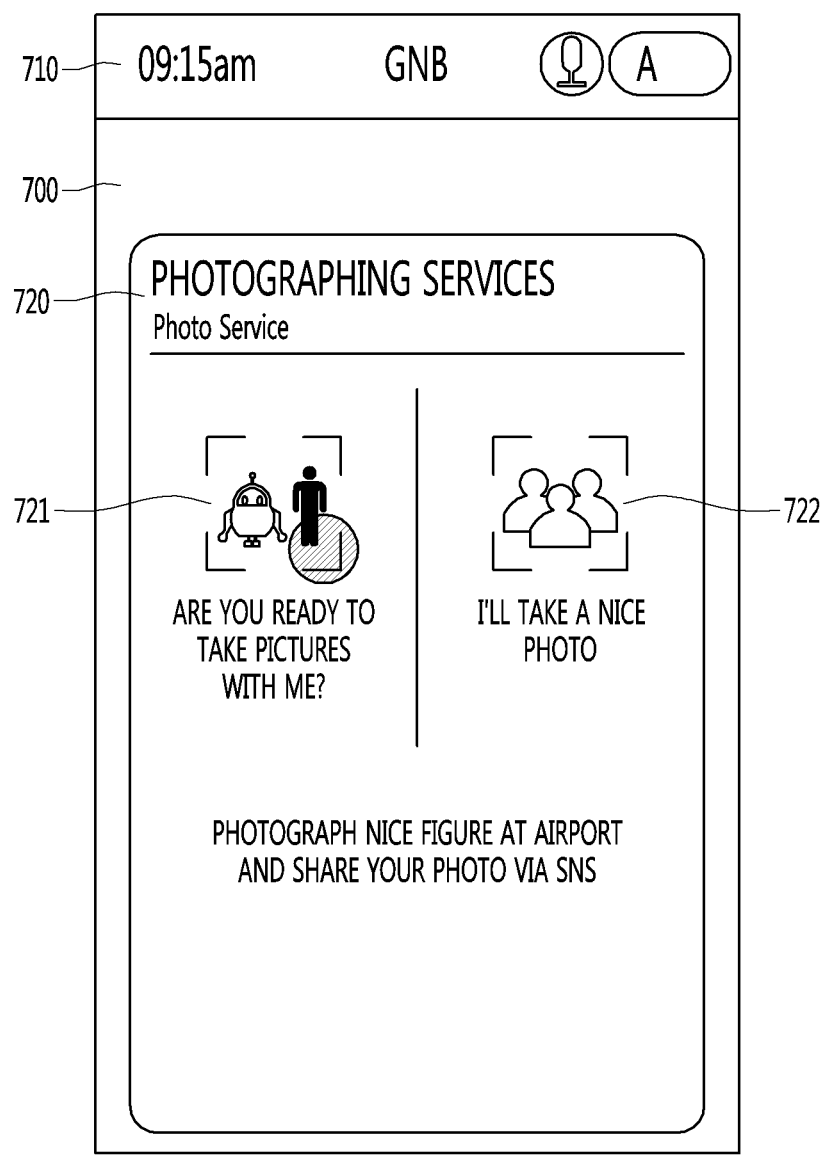
FIGS. 7 to 12 are diagrams referred to in describing a method of operating a mobile robot according to the embodiment of the present description.

FIG. 6 is a flowchart illustrating a method of operating a mobile robot according to an embodiment of the present description, and FIGS. 7 to 12 are diagrams referred to a in describing a method of operating a mobile robot according to an embodiment of the present description. FIGS. 6 and 7, a photographing menu 720, including a first photographing item (or first graphical object) 721 for allowing the mobile robot 1 to performs a specific operation for photographing and a second photographing item (or second graphical object) 722 for allowing the mobile robot 1 to photograph a user, is displayed on the display unit 710 (S610).

A user interface screen for photographing 700 may include a global navigation bar area 710 at the top in which menus and state information or the like, which are accessible from any screen, are displayed and a photographing menu 720 at the bottom. The display unit 710 of the mobile robot 1 according to an embodiment of the present description may include a first display 312 that displays a facial expression or the like and a second display 21 that displays various information on a large screen.

In this case, the user interface screen for photographing 700 may be displayed on the second display 21. In addition, while the user interface screen for photographing 700 is displayed on the second display 21, the first display 312 may display a face and/or eye expression image corresponding to "joy" so as to attract the user's attention and enable the user to have a good feeling.

On the other hand, the photographing menu 720 may be displayed after the mobile robot 1 guides a predetermined guide destination or when the mobile robot 1 is in a standby mode. For example, after the mobile robot 1 provides a user with an escort service while moving to a predetermined guide destination, the mobile robot 1 may guide the arrival to the destination (S1050). In this case, a user interface screen related to photographing, service evaluation, and the like may be displayed on the second display 21.

According to the user's speech input or touch input, the mobile robot 1 may perform photographing, service evaluation, and the like. Alternatively, the photographing menu 720 may be included in one of idle screens displayed when the mobile robot 1 is in a standby state. Alternatively, when the mobile robot 1 displays a main menu screen on the display unit 710 and the user touches a photographing item, that is, one of menu items included in the main menu screen, or requests photographing by speech input, the user interface screen 700 including the photographing menu 720 may be displayed on the second display 21.

On the other hand, the first photographing item 721 may allow the mobile robot 1 to perform a specific motion or other function for photographing and may be referred to as a '(robot-) together photographing item'. The user may instruct the mobile robot 1 to perform the specific motion or other function for the robot-together photographing by touching the first photographing item 721 by inputting speech corresponding to the first photographing item 721. As described below, the photographing item 721 may relate to controlling the robot 1 to perform various movements or other operations related to posing for an image to be captured by another robot 1 or by a user using another device (e.g., a user camera or a mobile device having a camera function).

The second photographing item 722 may be a photographing service for allowing the mobile robot 1 to photograph a user and may be referred to as a "(robot) photograph item" or a "general photographing item". The user may instruct the mobile robot 1 to photograph the user by touching the second photographing item 722 by inputting speech corresponding to the second photographing item 722.

That is, the first photographing item 721 may correspond to a service for photographing in which both the user and the mobile robot 1 are subjects, and the second photographing item 722 may correspond to a service for photographing in which the user is a subject. On the other hand, the first photographing item 721 may include an icon having a person and a moving robot in a photograph area, and an object representing a service for photographing by the mobile robot 1, such as a text of "Are you ready to take pictures with me?".

In addition, the second photographing item 722 may include an icon having only a person in a photograph area, and an object representing a service for photographing by the mobile robot 1, such as a text of "I will take a nice photo" Users who use public places such as airports may often carry cameras. Even when a separate camera is not carried, in many cases, the user's mobile terminal is equipped with a camera. Further, the use may have a great deal of interest in and a good feeling about the mobile robot 1, and therefore, may want to shoot the mobile robot 1 or take a picture with the mobile robot 1.

Accordingly, the mobile robot 1 according to the present description may perform a specific motion or other function designated by the user, thereby providing a service for allowing the user to more smoothly take a picture together with the mobile robot 1. To this end, when the first photographing item 711 is selected (S620), the control unit 740 may allow the second display 21 to display a screen for guiding posing settings of the mobile robot 1 (S630).

For example, the motion setting of the mobile robot 1 may be a setting for selecting a facial image displayed on the first display 21 of the mobile robot 1 during a preset first reference time. In this case, the screen for guiding the motion setting of the mobile robot 1 may be a setting screen for selecting a facial expression image displayed on the first display 21. According to embodiments, when the first photographing item 711 is selected (S620), the control unit 740 may allow the sound output unit 780 to output a voice guidance message to guide the motion setting of the mobile robot 1.

Figure 8:
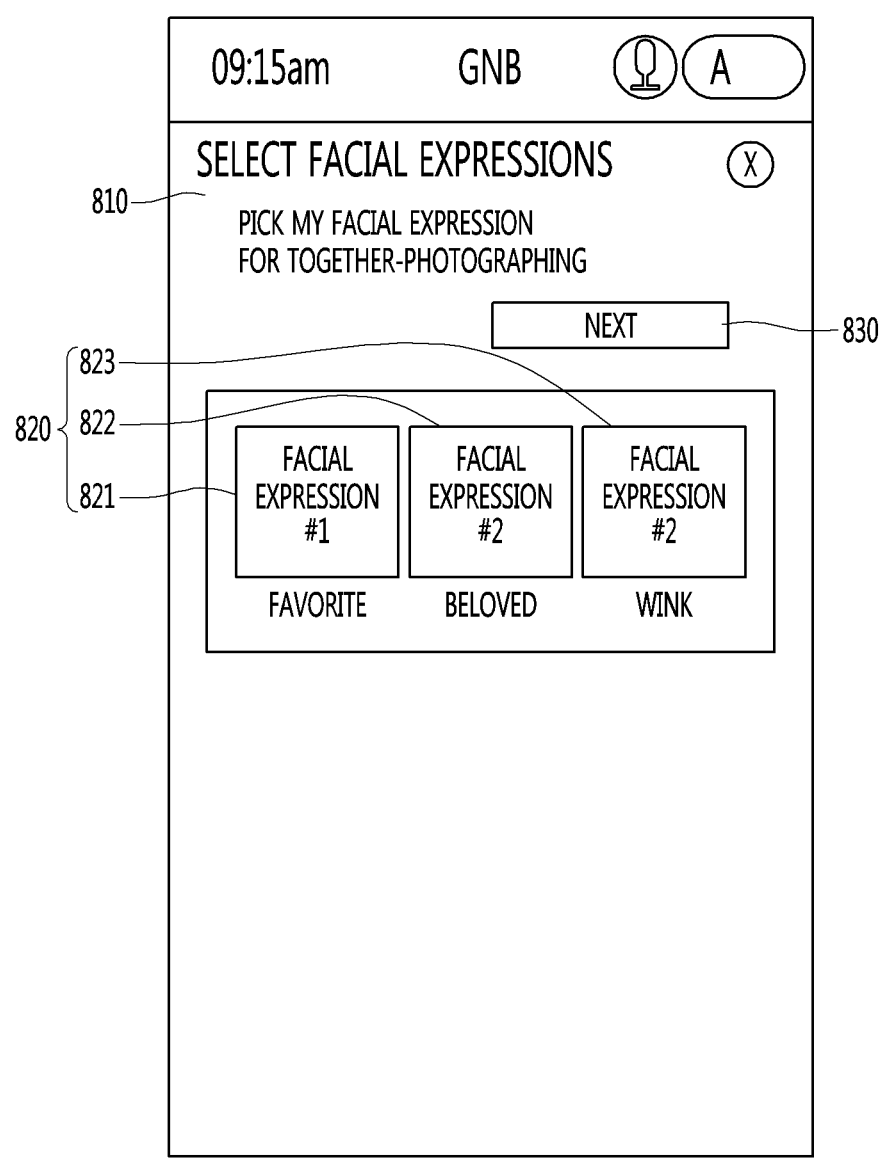

FIG. 8 shows an example of selecting a facial expression image. Referring to FIG. 8, a screen 810 that guides the motion setting of the mobile robot 1 may include a facial expression list 820 that is settable and a next item 830 that proceeds to the next step after selection.

For example, the facial expression list 820 may include a facial expression #1 821 that is set corresponding to a "joy" or "favorite" emotion, a facial expression #2 822 that is set corresponding to a "beloved" emotion, and a facial expression #3 823 that is set corresponding to a "wink" motion. The user may select any one of the facial expressions 821, 822, and 823 included in the facial expression list 820 and select the next item 830.

Figure 9:
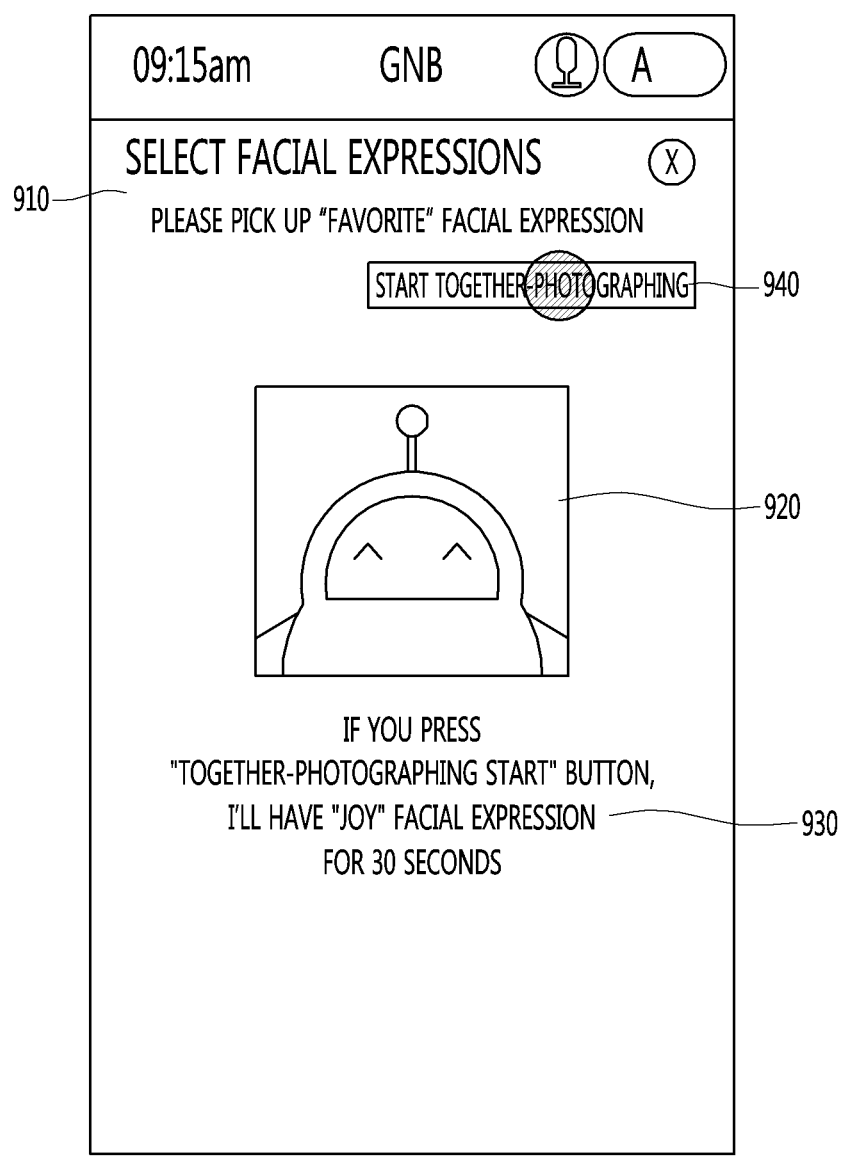

FIG. 9 illustrates a next screen when the facial expression #1 821 that is set corresponding to the "joy" or "favorite" emotion is selected. Referring to FIG. 9, a screen 910 for guiding a motion setting of the mobile robot 1 may include an example image 920 of a selected facial expression, motion guidance 930 of the mobile robot 1, and a together-photographing start button 940.

According to an embodiment, the motion setting of the mobile robot 1 may further select a gesture motion to be performed by the mobile robot 1 during a first reference time. The control unit 740 may perform control not only to display an image corresponding to a specific facial expression but also to perform a gesture motion to move or rotate a specific part such as an arm or a head in response to a user input.

In addition, since the mobile robot 1 is movable, when the user desires to take a picture together with the mobile robot, the mobile robot 1 may need to stop or move in a specific pattern desired by the user to enable smooth photographing. Accordingly, the control unit 740 may allow the mobile robot 1 to stop or travel in a specific pattern in response to a user input. That is, the motion setting of the mobile robot 1 may be a setting for selecting a traveling pattern of the mobile robot 1 during the first reference time.

When the motion setting of the mobile robot 1 is input (S640), the control unit 740 may allow the mobile robot 1 to perform a corresponding motion for the first reference time based on the input motion setting (S650, S660). That is, the mobile robot 1 may perform the set motion (S650), and may wait while maintaining the state in which the set motion is performed for the first reference time or a set predetermined time (S660).

Figures 10, 11:
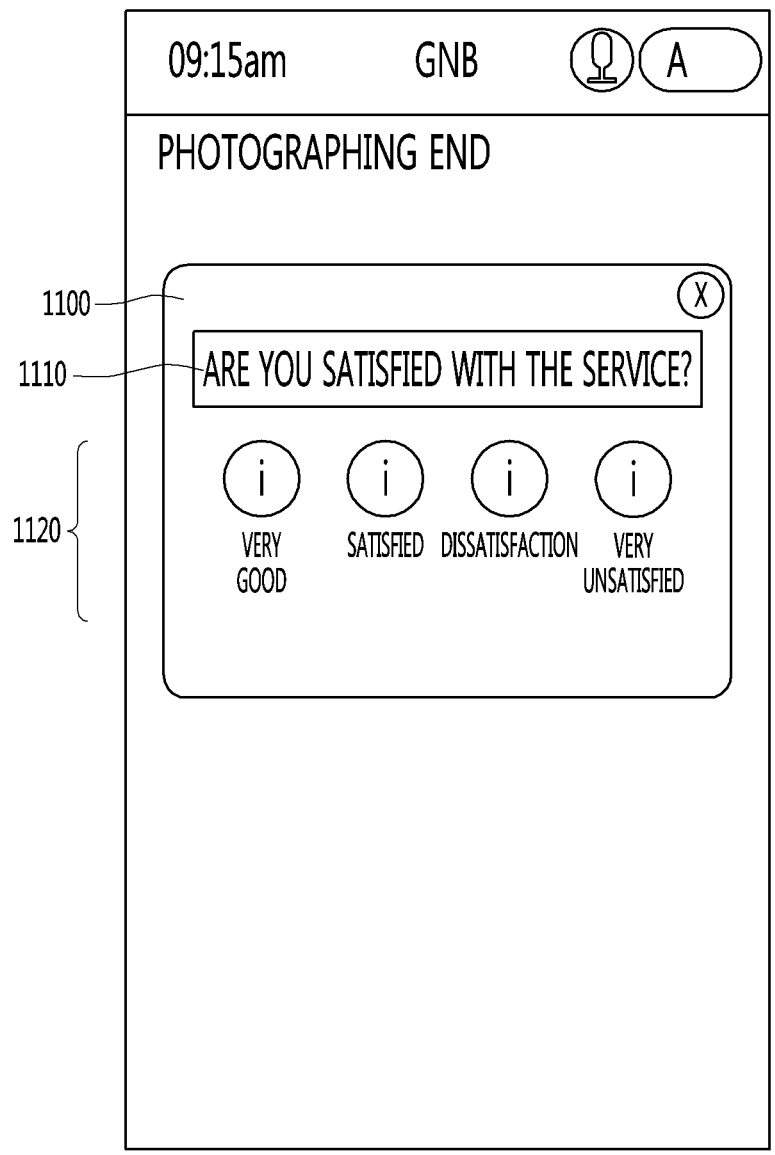

FIG. 10 illustrates a guidance message that may be output on a guidance image that may be displayed on the second display 21 or a guidance message that may be output through the sound output unit 780 during a first reference time.

Referring to section A of FIG. 10, a guidance message such as "Please come next to me and pose, then take a picture with your mobile phone or a camera" may be output as an image and/or audio. Referring to section B of FIG. 10, when the first reference time is short, the photographing ends soon. It is possible to count down the remaining time while a guidance message such as "5-4-3-2-1" is being output as an image and/or audio.

The motion setting of the mobile robot 1 according to the present description may include at least one of an image setting such as facial expression displayed by the mobile robot 1, a gesture setting, stopping, and travel setting such as the travel pattern.

Therefore, it is possible to input various settings suitable for various photographing such as time-lapse photographing, and the mobile robot 1 may perform a specified operation, thereby further enhancing user satisfaction. The user may take a picture together with the mobile robot 1 which is performing the specified operation for the first reference time.

On the other hand, after the first reference time has elapsed, a result screen (not shown) may be displayed on the display unit 710 (S670). For example, the result screen may include at least one of a photographing end item or a re-photographing item. The re-photographing item may be a displayed graphical symbol, and when the re-photographing item that, when selected by a user, causes the mobile 1 to perform another pose with the user. For example, when the user selects the re-photographing item, it is possible to return to the step of displaying a guidance screen for robot motions (S630) in which a motion is capable of being again selected. When the user selects the photographing end item or other corresponding graphical symbol, the screen displayed on the display unit 710 may return to an original screen such as the main screen, before photographing, or may switch to a satisfaction survey screen and a gift provision screen.

FIG. 11 illustrates a satisfaction survey screen. Referring to FIG. 11, a satisfaction survey pop-up window 1100 may be displayed on the second display 21. The satisfaction survey pop-up window 1100 may include a message 1110 for guiding the satisfaction survey and evaluation items 1120 for allowing a user to select a satisfaction and perform evaluation. The mobile robot 1 according to an embodiment of the present description may include a gift such as a memorial card, and may present a gift to a user when there is currently a remaining gift.

Figure 12:
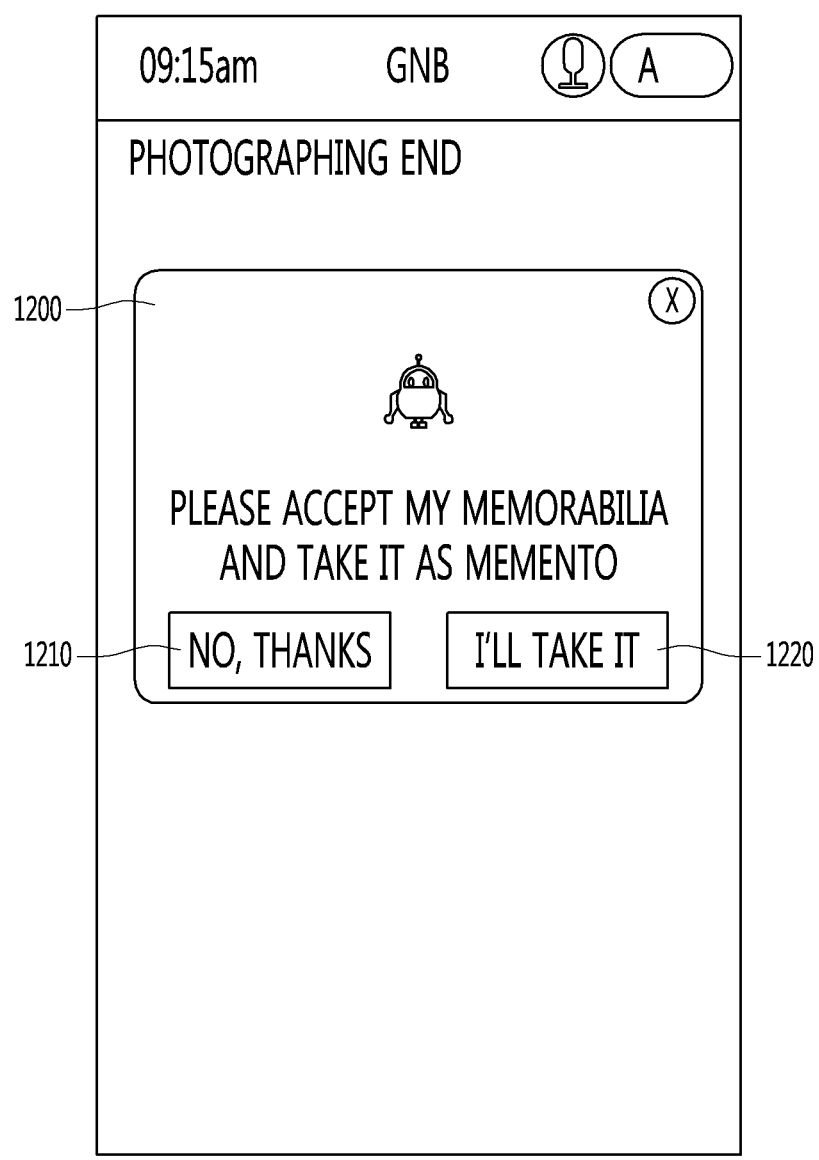

FIG. 12 illustrates a gift provision screen. Referring to FIG. 12, the second display 21 may display a gift provision pop-up window 1200. The gift provision pop-up window 1200 may include a message to guide gift provision, an item 1210 to allow the user to reject receipt of a gift, and an item 1220 to allow the user to approve receipt of gift.

If there is no special input or the rejection item 1210 is selected during the preset time, the screen returns directly to the first screen, and when the approval item 1220 is selected, the user can return to the initial screen after providing the gift. On the other hand, if the second photographing item 722 is selected (S625), the control unit 740 can display a screen for guiding photographing of the mobile robot 1 on the display unit 710 (S680).

A screen (not shown) for guiding the photographing of the mobile robot 1 may include a photo-taking button for selecting photographing and an end button for ending the guide without taking a picture. In addition, the screen for guiding the photographing of the mobile robot 1 may include a voice recognition microphone button and an audio guidance guide.

On the other hand, if the user selects photographing by touch input or voice input, a camera view screen of the camera can be displayed on the second display 21. Here, the camera view (view) screen may mean a screen that the camera is currently shooting.

The control unit 740 may control the second display 21 to display a guide message for an action to control photographing and a camera view screen. In accordance with the user command, the control unit 740 can control the photographing of the user by using the camera of the image acquiring unit 718 (S685). More preferably, the control unit 740 may output a result of the countdown as an image and/or audio after a predetermined second reference time has elapsed, and photograph the user using the camera of the image acquiring unit 718 (S685).

After photographing, the mobile robot 1 may display a photographing result screen including the photographed image on the display unit 710 (S690). For example, the control unit 740 may perform control such that the photographing result screen including the photographed image is displayed on the second display 21 (S690). The photographing result screen may include at least a photographed image, and include menu items such as a photographing end item, a re-photographing item, and the like.

The control unit 740 may display the photographed picture on the first display 312 or the second display 21 after photographing and then allow the communication unit 790 to transmit the photographed image by an e-mail or the like according to the user's selection.

According to at least one embodiment of the present description, it is possible to provide various services such as a guidance service and various photographing services in a public place. According to at least one of the embodiments of the present description, the robot may perform a specific motion such that the robot and the user may be photographed together with the photographing service in which the robot photographs the user. Also, according to at least one of the embodiments of the present description, it is possible to provide enjoyment and convenience to the user.

Mobile robots operating in public places such as airports, train stations, department stores, and harbors, where many people stay or move, may perform autonomous traveling while recognizing people and obstacles, and provide various services. For example, the mobile robot may provide a guidance service to provide guide to a specific destination. Mobile robots operating in public places can provide enjoyment and convenience by attracting people's attention and communicating with people. Therefore, the mobile robot may provide various services besides the guidance service.

An aspect of the present description provides a mobile robot capable of providing various services such as a guidance service and a photographing service in a public place and an operation method thereof. An aspect of the present description provides a photographing service for photographing a user by the robot and performing a specific motion such that the robot and the user are photographed together. An aspect of the present description provides enjoyment and convenience to the user.

To achieve the above or other aspects, a method of operating a mobile robot includes displaying, on a display unit, a photographing menu including a first photographing item for allowing the mobile robot to perform a specific motion for photographing and a second photographing item for allowing the mobile robot to photograph a user, displaying a screen for guiding a motion setting of the mobile robot on the display unit when the first photographing item is selected, performing, by the mobile robot, a corresponding motion based on an input motion setting for a first reference time when the motion setting of the mobile robot is input, and displaying a result screen on the display unit after the first reference time has elapsed.

According to at least one embodiment of the present description, it is possible to provide various services such as a guidance service and various photographing services in a public place. Further, according to at least one embodiment of the present description, the robot may not only provide a photographing service for photographing a user by the robot but also perform a specific motion such that the robot and the user are photographed together.

Also, according to at least one of the embodiments of the present description, it is possible to provide enjoyment and convenience to the user. Meanwhile, various other effects will be directly or implicitly disclosed in the detailed description according to the embodiments of the present description.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of operating a mobile robot, comprising:
presenting, on a display, a menu that includes a first graphical object related to controlling the mobile robot to pose for a photograph and a second graphical object related to controlling the mobile robot to photograph a user, the first graphical object corresponding to a service for photographing in which both an user and the mobile robot are subjects;
presenting, on the display, a first screen to receive an input related to selecting a pose setting of the mobile robot when the first graphical object is selected, the first screen to receive the input including a facial expression list, and the input related to selecting the pose setting including a selection from the facial expression list of a facial expression image to be present on the display of the mobile robot during a first time;
performing, by the mobile robot and during the first time, a pose based on the pose setting; and
presenting, on the display, a second screen after the first time has elapsed, the second screen including information including at least one of a photographing end graphical item or a re-photographing graphical item.

2. The method of claim 1, wherein the input of the pose setting of the mobile robot further includes a selection of a gesture motion to be performed by the mobile robot during the first time.

3. The method of claim 1, wherein the input of the pose setting of the mobile robot includes a selection of a traveling pattern to be performed by the mobile robot during the first time.

4. The method of claim 1, further comprising outputting an audio guidance message to guide the input of the pose setting of the mobile robot when the first graphical object is selected.

5. The method of claim 1, wherein the second screen includes at least one of a stored photograph associated with the mobile robot performing the pose or a third graphical object related to controlling the mobile robot to perform another pose.

6. The method of claim 1, further comprising:
displaying a third screen to guide photographing of the user by the mobile robot when the second graphical object is selected.

7. The method of claim 1, further comprising:
capturing an image through a camera; and
displaying a third screen that includes data associated with the captured image.

8. The method of claim 7, wherein capturing the image through the camera includes capturing an image after a second time has elapsed.

9. The method of claim 1, wherein the menu is displayed after the mobile robot guides the user to a destination.

10. The method of claim 1, wherein the menu is displayed when the mobile robot enters a standby mode.

11. The method of claim 1, further comprising:
outputting a guidance message during the first time, the guidance message including instructions to the user related to capturing an image of the mobile robot when performing the pose.

12. The method of claim 6, wherein the third screen provides an indication of when the mobile robot will photograph the user.

13. A mobile robot comprising:
a wheel that rotates based on a received force to move the mobile robot;
a display;
a camera; and
a controller configured to:
manage the display to present a menu that includes a first graphical object related to controlling the mobile robot to pose for a photograph, and a second graphical object related to controlling the mobile robot to photograph a user, the first graphical object corresponding to a service for photographing in which both the user and the mobile robot are subjects;
manage the display to present a first screen to receive an input related to a pose setting of the mobile robot when the first graphical object is selected, wherein the mobile robot performs a pose during a first time based on input related to the pose setting, the first screen to receive the input including a facial expression list, and the input related to selecting the pose setting including a selection from the facial expression list of a facial expression image to be displayed on the display of the mobile robot during the first time; and
manage the display to present a second screen after the first time has elapsed, the second screen including at least one of a photographing end graphical item, a re-photographing graphical item, or a third graphical object related to controlling the mobile robot to perform another pose.

14. The mobile robot of claim 13, wherein the input of the pose setting of the mobile robot includes a selection of a facial expression image to be displayed on the display of the mobile robot during the first time, and wherein the controller further manages the display to present the facial expression image.

15. The mobile robot of claim 13, wherein the input of the pose setting of the mobile robot further includes a selection of a gesture motion to be performed by the mobile robot during the first time, and wherein the controller further manages at least one of a movement of the mobile robot or a motion of a component of the mobile robot based on the gesture motion.

16. The mobile robot of claim 13, wherein the input of the pose setting of the mobile robot includes a selection of a traveling pattern to be performed by the mobile robot during the first time, and wherein the controller further manages the wheel to selectively rotate based on the traveling pattern.

17. The mobile robot of claim 13, wherein the display is a first display, and wherein the mobile robot further includes a second display provided below the first display, the second display presenting information related to a guidance function performed by the mobile robot.

18. The mobile robot of claim 13, wherein the camera includes a plurality of red, green, blue, and distance (RGBD) sensors.

19. The mobile robot of claim 13, further comprising a speaker to output a guidance message, the guidance message including instructions to the user related to the mobile robot performing the pose when the first graphical object is selected, or an indication of when the mobile robot will photograph the user when the second graphical object is selected.

* * * * *